(12) United States Patent
Fan

(10) Patent No.: US 11,473,601 B2
(45) Date of Patent: Oct. 18, 2022

(54) FOLDABLE THREE-SECTION CLAMPING DEVICE

(71) Applicant: Eagle Fan, Hsinchu (TW)

(72) Inventor: Eagle Fan, Hsinchu (TW)

(*) Notice: Subject to any disclaimer, the term of this patent is extended or adjusted under 35 U.S.C. 154(b) by 251 days.

(21) Appl. No.: 16/870,214

(22) Filed: May 8, 2020

(65) Prior Publication Data

US 2021/0348629 A1 Nov. 11, 2021

(51) Int. Cl.
*F16B 2/10* (2006.01)
*F16M 13/02* (2006.01)

(52) U.S. Cl.
CPC ............. *F16B 2/10* (2013.01); *F16M 13/022* (2013.01)

(58) Field of Classification Search
CPC ... F16B 2/10; F16B 2/12; F16B 7/105; F16M 13/022
See application file for complete search history.

(56) References Cited

U.S. PATENT DOCUMENTS

| 6,085,113 A * | 7/2000 | Fan | B60R 11/0241 |
| | | | 379/426 |
| 7,537,190 B2 * | 5/2009 | Fan | H04B 1/3877 |
| | | | 379/426 |
| 10,272,847 B1 * | 4/2019 | Fan | B60R 11/0241 |

* cited by examiner

*Primary Examiner* — Victor D Batson
*Assistant Examiner* — Amber Nicole Helms
(74) *Attorney, Agent, or Firm* — Lin & Associates Intellectual Property, Inc.

(57) ABSTRACT

A foldable three-section clamping device is disclosed, comprising a first support unit, provided with a rotatable first pivot member, a first extension member extending from middle of the first pivot member, and the first support unit having a clamp for clamping at a place; a second support unit, provided with a rotatable second pivot member, and a second extension member extending from middle of the second pivot member, the first extension member and the second extension member being mutually docked and both being rotatable along the same axis; a clamping unit being disposed on the second support unit, and the clamping unit further comprising a first clamping arm, an extension member and a second clamping arm, the extension member being disposed on the first clamping arm and adjustable by sliding, the second clamping arm being disposed on the extension member and adjustable by sliding.

3 Claims, 11 Drawing Sheets

FOLDABLE THREE-SECTION CLAMPING DEVICE

BACKGROUND OF THE INVENTION

1. Field of the Invention

The present invention relates generally to a clamping device, and more particularly, to a clamping device suitable for large-sized portable electronic products, and foldable to reduce the storage space.

2. The Prior Arts

The computer that plays a very important role in 3C products undergoes a revolutionary trend since the rapid rise of tablet computers. The main reason is that the tablet computer is a thin, light, short and convenient personal computer with high portability. The tablet computer uses the touch screen as the basic input device, omitting the traditional keyboard and mouse. Most tablet computers also support finger operations, allowing the user to use finger for controlling, writing, zooming images and patterns. Moreover, due to the popularization of mobile Internet access, higher-level core processors and the improvement of technology, tablet computers are more convenient and user-friendly than ordinary computers.

The size of tablet computers on the market can be roughly divided into: 10-plus inch, 9.7-inch, 9-inch, 8-inch and 7-inch. If a user wants to use the tablet at a tilted position or stand on the desktop, the user needs to use a set of support stands to achieve this purpose. However, in order to match the size of the tablet computer, the current support stand requires a relatively large structural size, which not only takes up space but also is difficult to store and to port around. In view of the above problems, it is necessary to devise other feasible solutions.

SUMMARY OF THE INVENTION

A primary objective of the present invention is to provide a foldable clamping device, which is mainly provided with a set of three-section clamping unit, to enlarge the clamping range of the clamping unit, and to be used not only for small-sized mobile phones but also for large-sized tablet computers, and the overall structure can be reduced in size after folding, easy to store or port around.

For achieving the foregoing objectives, the present invention provides a foldable three-section clamping device, comprising a first support unit, provided with a rotatable first pivot member, a first extension member extending from the middle of the first pivot member, and the first support unit having a clamp, used to clamp at a place to be fixed to; a second support unit, provided with a rotatable second pivot member, and a second extension member extending from the middle of the second pivot member, the first extension member and the second extension member being mutually docked and both being rotatable along the same axis; a clamping unit being disposed on the second support unit, and the clamping unit further comprising a first clamping arm, an extension member and a second clamping arm, the extension member being disposed on the first clamping arm and the position being adjustable by sliding, the second clamping arm being disposed on the extension member and the position being adjustable by sliding, to provide a portable electronic product to be clamped between the first clamping arm and the second clamping arm after the adjusting position.

In a preferred embodiment of the present invention, the clamp comprises a clip and a movable piece, the clip is located on a side of the first support unit away from the first pivot member, the movable piece is movable linearly in a direction away from the clip, and a tension spring is provided in the first support unit to contact the movable piece to maintain the clamping force between the clip and the movable piece.

In a preferred embodiment of the present invention, after being folded, the clamping unit is located between the clip and the first pivot member.

In a preferred embodiment of the present invention, the second clamping arm is provided with at least a first spring in contact with the extension member, in the absence of external force, the first spring enables the second clamping arm to move to its original position, a latch structure is provided at the first clamping arm to fix the adjusted position of the extension member.

In a preferred embodiment of the present invention, the latch structure comprises a pressing member and a latching member located at the first clamping arm, and at least a rack located at the extension member, the pressing member and the latching member are pivotally connected to a housing of the first clamping arm, the pressing member also has a flip member to contact the latching member, the latching member has at least one convex tooth contacting the rack; when the pressing member is pressed down, the flip member is raised and the convex tooth is lifted away from the rack to disengage from the rack, thereby adjusting the relative position of the extension member and the first clamping arm.

In a preferred embodiment of the present invention, at least one first spring is disposed in the second clamping arm to contact the extension member, and in the absence of external force, the first spring enables the second clamping arm to move to its original position; at least one second spring is disposed in the first clamping arm to contact the extension member, and in the absence of external force, the second spring moves the extension member to its original position.

In summary, compared with the conventional structure, the present invention provides the following advantages:
1. Using the special pivot structure of the first support unit and the second support unit to provide a full range of angle adjustment for both support units to facilitate convenience, and the volume after folding is small, which is convenient for storage or portability;
2. The three-section clamping unit enlarges the clamping range of the clamping unit, and is suitable not only for small-sized mobile phones but also for large-sized tablet computers.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
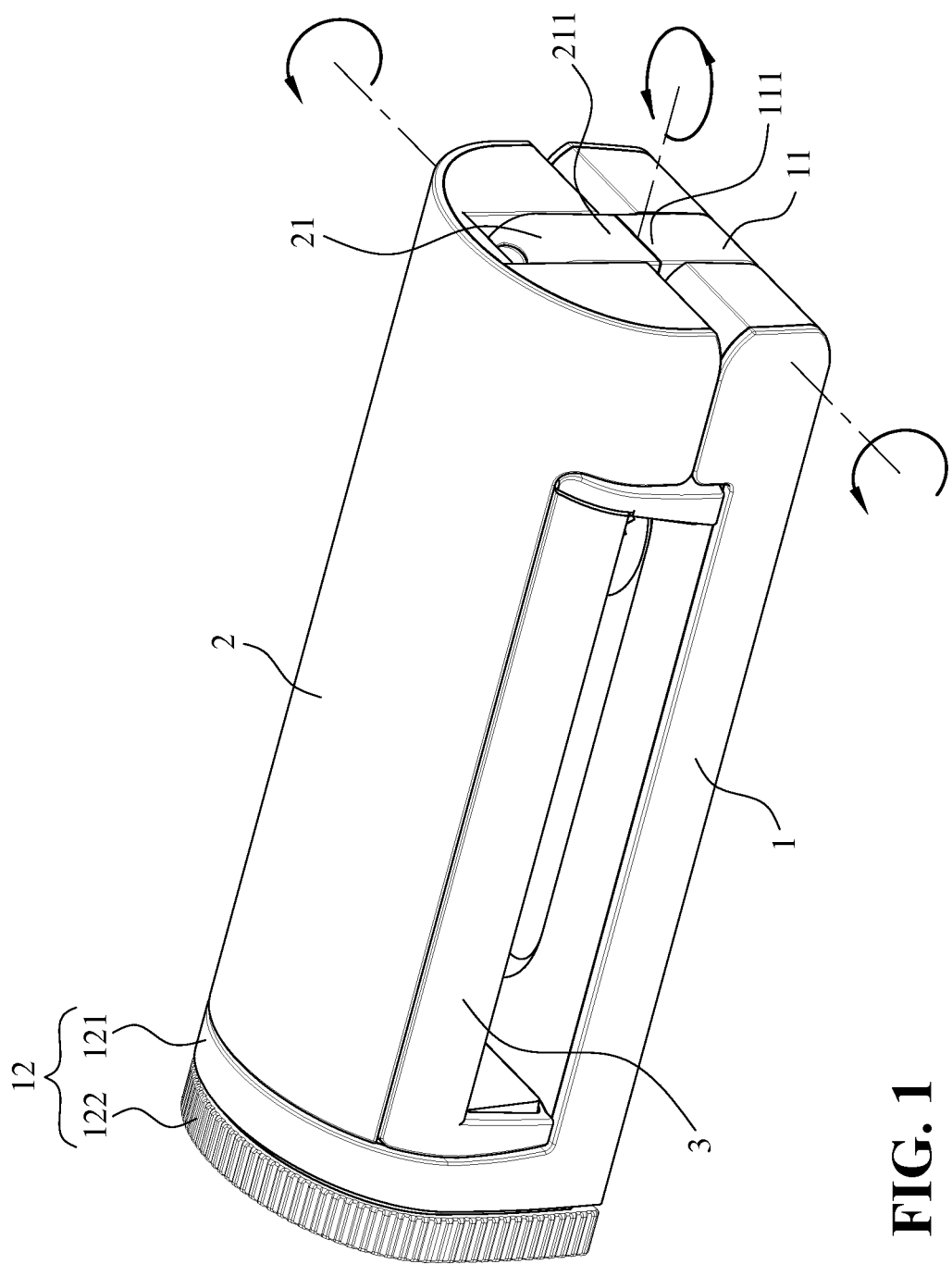
FIG. 1 is a perspective view of a foldable three-section clamping device in a folded state.
Figure 2:
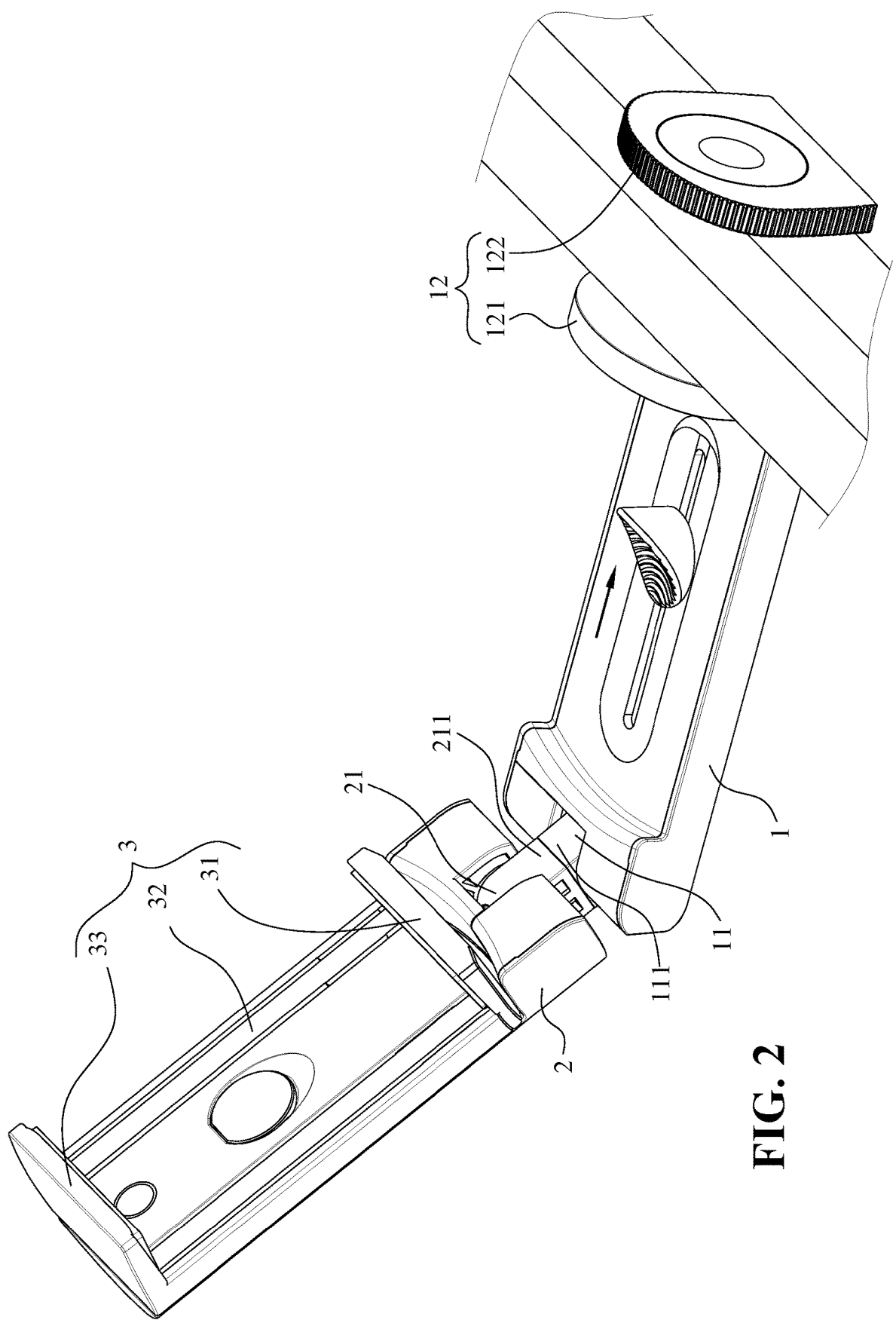
FIG. 2 is a perspective view of a foldable three-section clamping device in an unfolded state.
Figure 3:
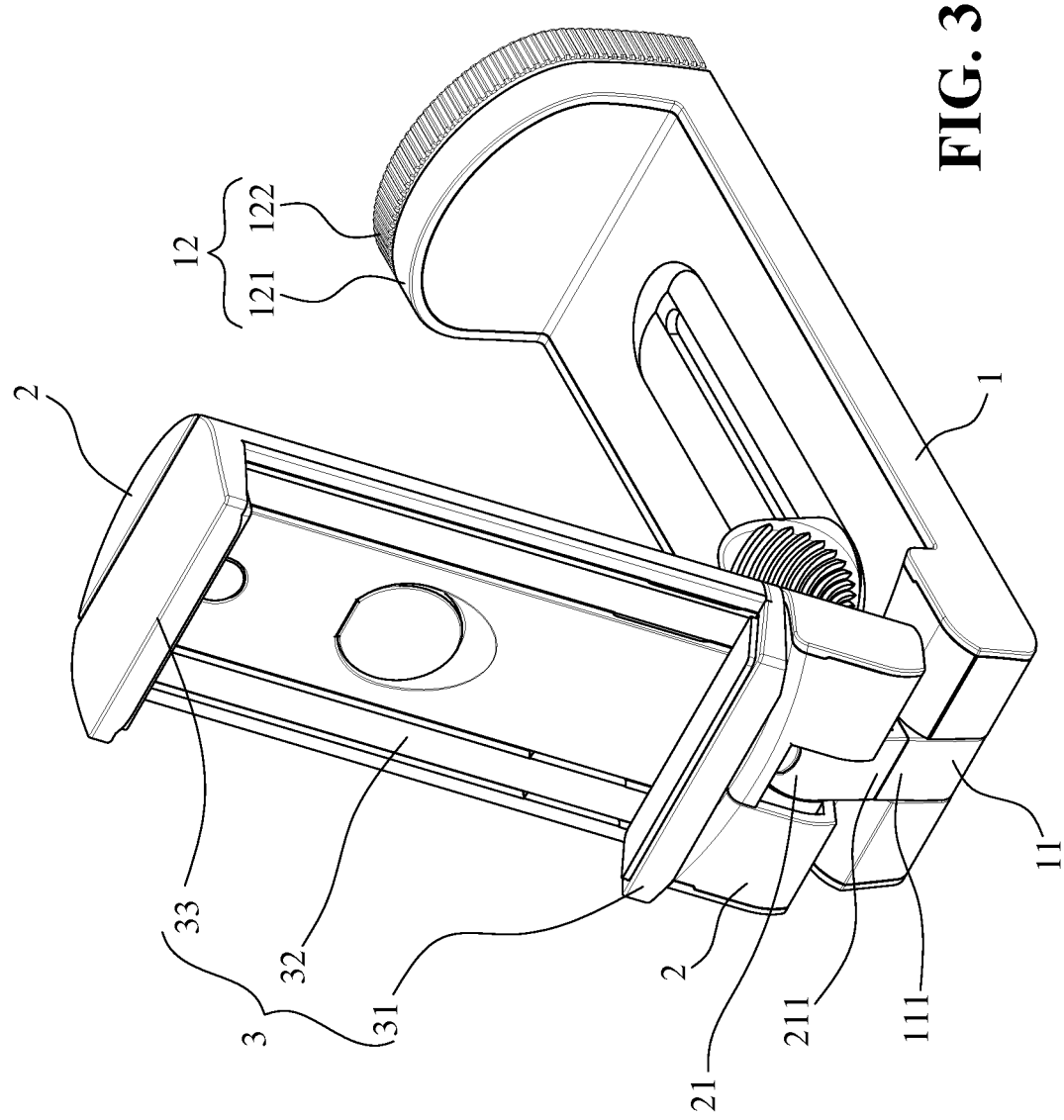
FIG. 3 is a perspective view of a foldable three-section clamping device in another unfolded state.

FIG. 1 is a perspective view of the folded state of the present invention. FIG. 2 and FIG. 3 are perspective views of the present invention of different unfolded states for use. The foldable three-section clamping device comprises a first support unit 1, a second support unit 2, and a clamping unit 3. The first support unit 1 is provided with a rotatable first pivot member 11 and a first extension member 111 extending from the first pivot member 11. The second support unit 2 is provided with a rotatable second pivot member 21 and a second extension member 211 extending from the second pivot member 21. The first extension member 111 and the second extension member 211 are butted against each other and both can rotate along the same axis. As such, the first pivot member 11 provides a specific axial rotation angle of the first support unit 1, the second pivot member 21 provides a specific axial rotation angle of the second support unit 2, in addition to the first extension member 111 and the second extension member 211 which can rotate relatively to the same central axis, so that the first support unit 1 and the second support unit 2 can perform a nearly 360-degree angle adjustment, as shown in FIG. 1, FIG. 2, and FIG. 3.

The first support unit 1 is provided with a clamp 12 at an end away from the first pivot member 11, and the clamp 12 is used to clamp at a place to be fixed to. The clamp 12 can be of various types, and the present embodiment only describes one of them. The clamp 12 comprises a clip 121 and a movable piece 122. The clip 121 is located on a side of the first support unit 1 away from the first pivot member 11, and the movable piece 122 can move linearly away from the clip 121 and the first pivot member 11. A tension spring (not shown) inside the first support unit 1 is in contact with the movable piece 122 to maintain the clamping force of the movable piece 122 and the clip 121. In the present embodiment, as shown in FIG. 1, after being folded, the clamping unit 3 may be located between the clip 121 and the first pivot member 11, thereby reducing the overall volume after folding. In addition, the clamp 12 can clamp a plate (as shown in FIG. 2) or other parts to be fixed to. The first support unit 1 and the second support unit 2 are adjustable to various angles according to the aforementioned adjustment method.

Figure 4:
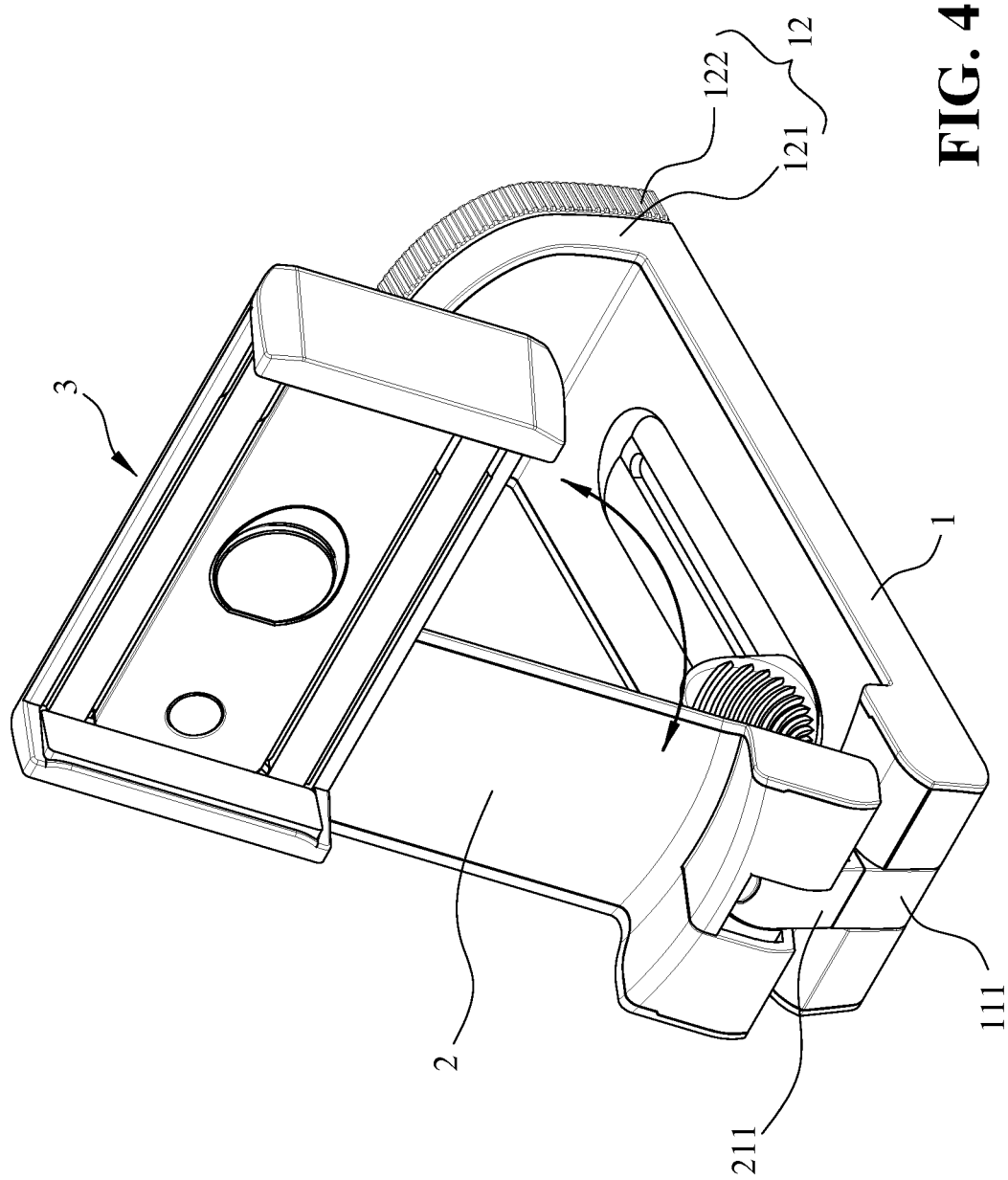
FIG. 4 is a perspective view after adjusting the position of the clamping unit of the foldable three-section clamping device.
Figure 5:
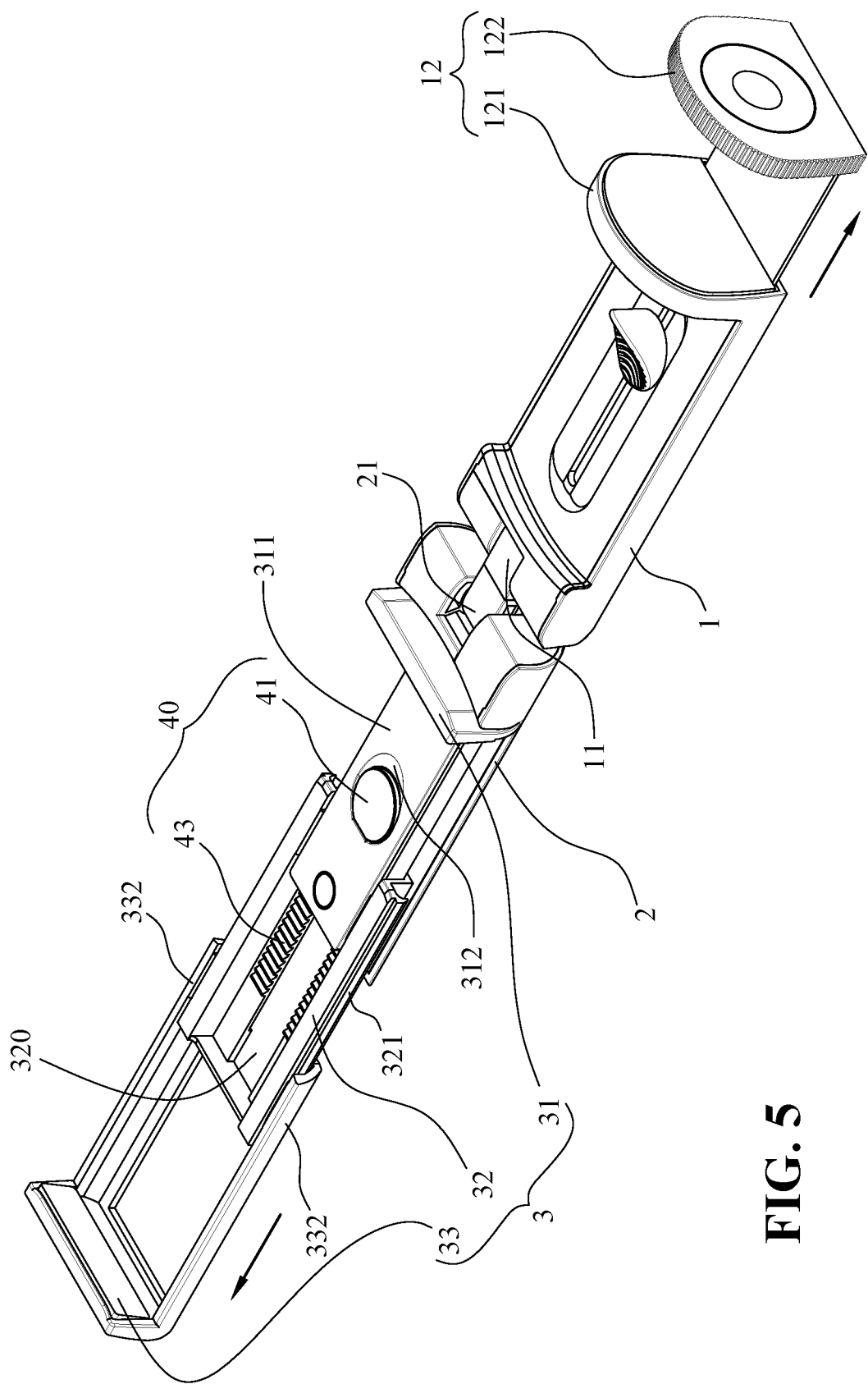
FIG. 5 is a perspective view of the foldable three-section clamping device after the clamping unit is pulled apart.

The main improvement of the present invention is that: the second support unit 2 is mounted with a three-section clamping unit 3. The clamping unit 3 can be fixedly or rotatably mounted on the second support unit 2. As shown in FIG. 4, in the present embodiment, the clamping unit 3 is rotatably mounted on the second support unit 2. FIG. 5 is a perspective view of the clamping unit 3 after being pulled apart. The clamping unit 3 is a three-section structure, including a first clamping arm 31, an extension member 32 and a second clamping arm 33. The extension member 32 is mounted on the first clamping arm 31 and is adjustable in position by sliding. The first clamping arm 31 and the extension member 32 form a lateral housing 310 shown in FIG. 7 with a housing cover 311. A though hole 312 is formed on the housing cover 311. The second clamping arm 33 is mounted on the extension member 32 and is adjustable in position by sliding. After being adjusted in the foregoing manner, the distance between the first clamping arm 31 and the second clamping arm 33 can be changed to clamp a portable electronic product between the first clamping arm 31 and the second clamping arm 33. The portable electronic product is a mobile phone or a tablet computer.

The overall shape of the first clamping arm 31 is L-shaped, with the bottom of the lateral housing 310 pivotally connected to the second support unit 2 so that the clamping unit 3 can be rotated. The extension member 32 is a clamping extension member and has a long U-shaped plate body with a slot 320 penetrating therethrough. The slot 320 is used for the pivotal connection structure between the second support unit 2 and the housing 310. The housing 310 is located in a middle recessed area of the extension member 32, so that the extension member 32 can slide along the housing 310 but will not be disengaged. The overall shape of the second clamping arm 33 is also L-shaped, disposed with two holding pieces 332 are arranged laterally facing each other. The two holding pieces 332 are in contact with side wings 321 on both sides of the extension member 32 and can slide so that the second clamping arm 33 and the extension member 32 can be adjusted in position.

Figure 6:
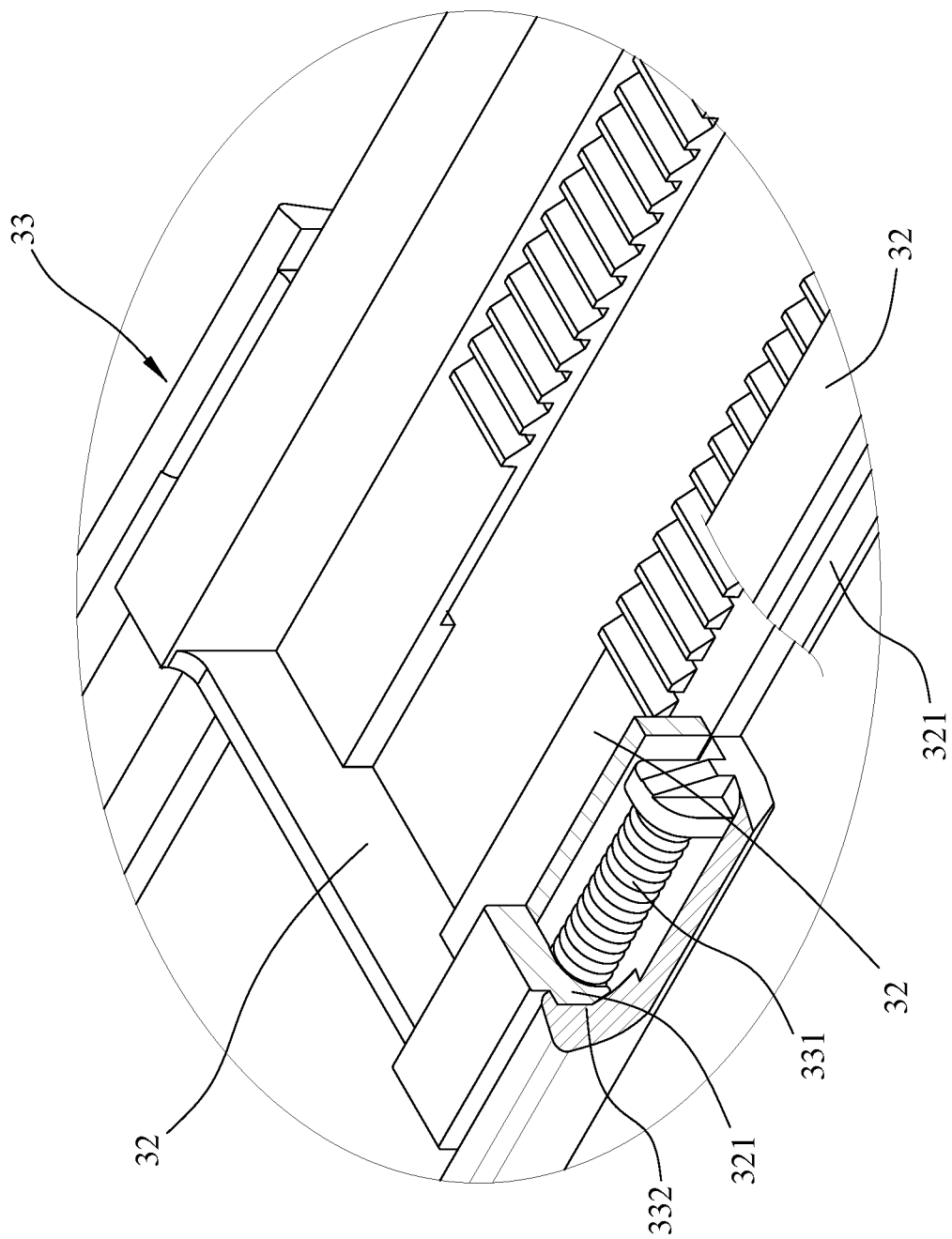
FIG. 6 is an enlarged view of a partial structure of the second clamping arm and an extension member of the foldable three-section clamping device.

To maintain the clamping force between the second clamping arm 33 and the first clamping arm 31, as shown in FIG. 6, the second clamping arm 33 is provided with at least a first spring 331 contacting the extension member 32. The first spring 331 is located in a space between the holding piece 332 and the side wing 321. The second clamping arm 33 is mounted on the side wings 321 on both sides of the extension member 32 by two holding pieces 332. Only one side of the structure is seen in the figure, and the other side of the structure is the same, so that the second clamping arm 33 can extend by sliding along the side wings 321 on both sides of the extension member 32 but will not be disengaged from. The first spring 331 provides force for the second clamping arm 33 to return to its original position. The first spring 331 in FIG. 6 is in a compressed state. When there is no external force, the second clamping arm 33 and the extension member 32 can return to the shapes shown in FIGS. 1 to 3.

Figure 7:
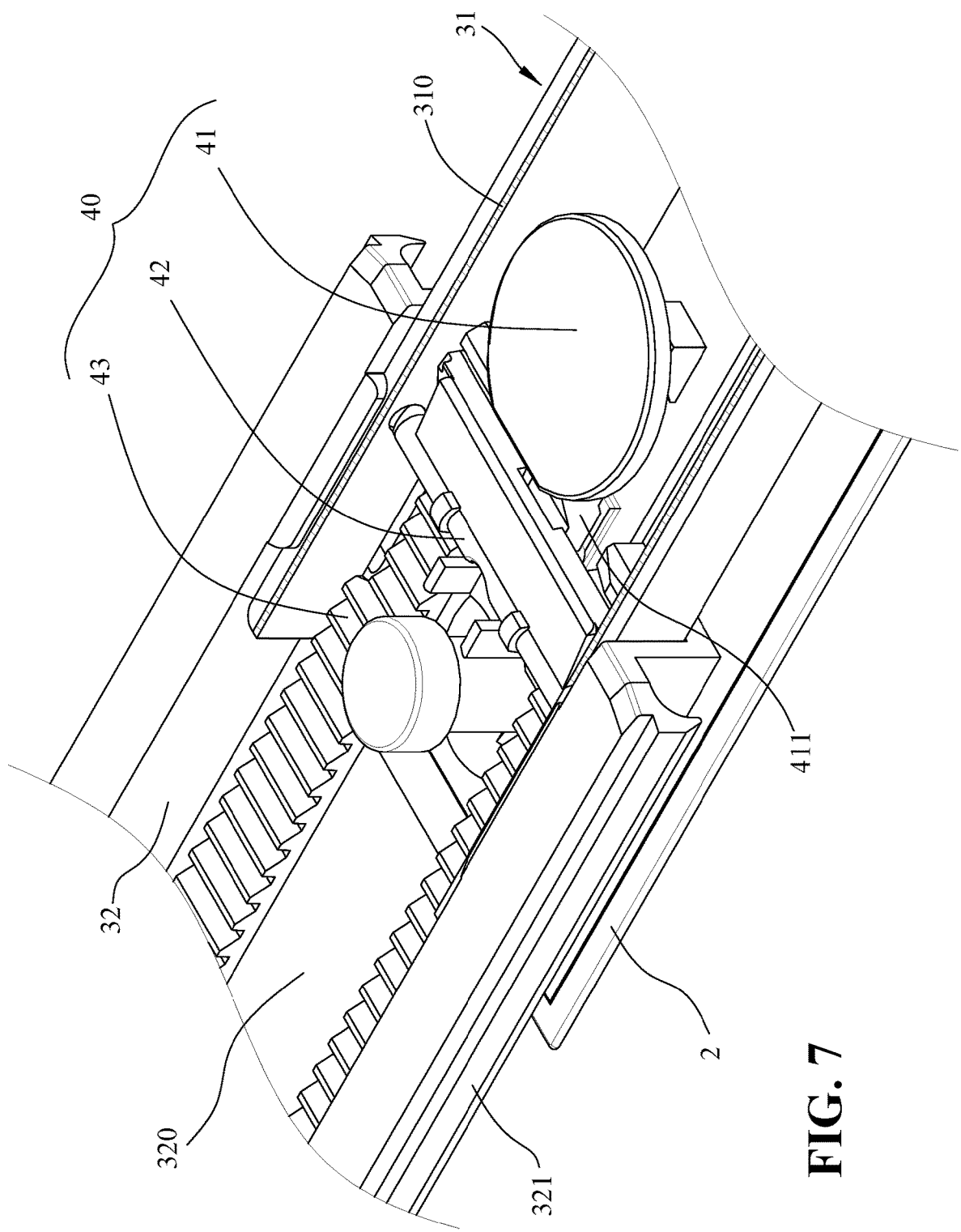
FIG. 7 is a perspective view of the latch structure of the foldable three-section clamping device located at the first clamping arm.
Figure 8:
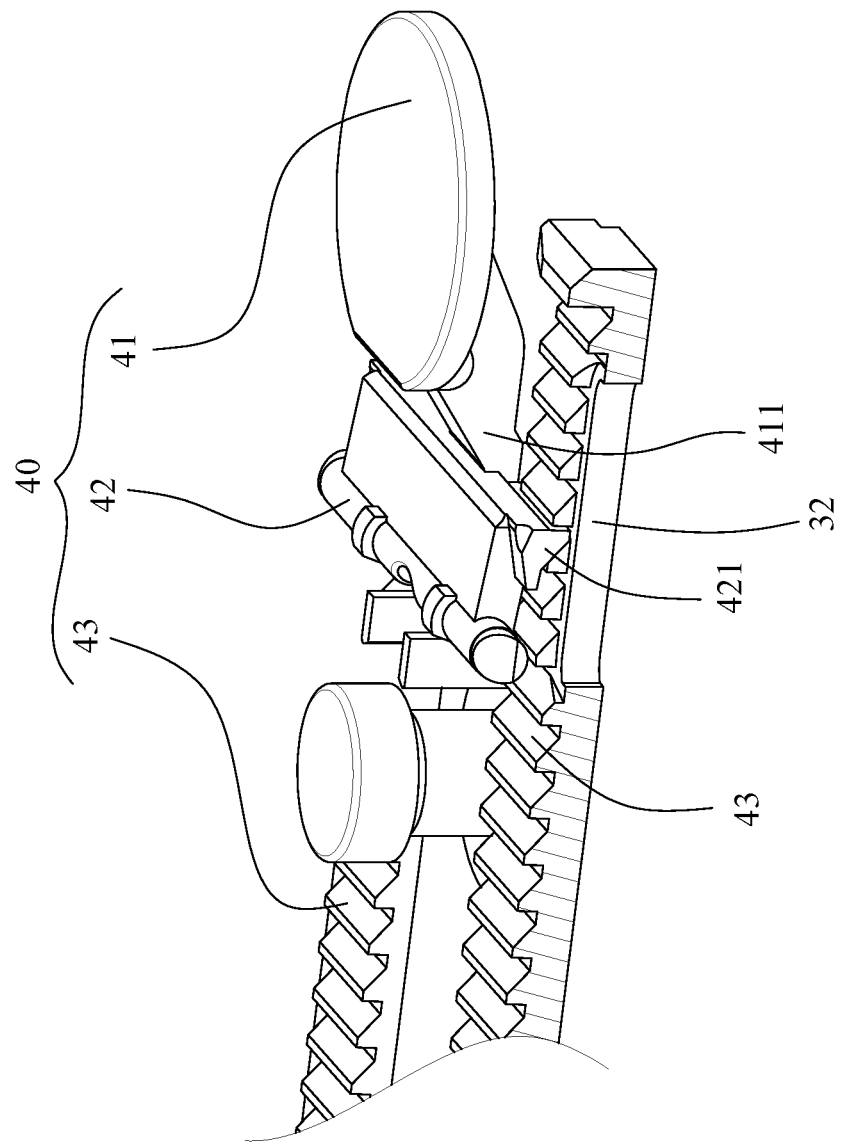
FIG. 8 is a schematic view of the latch structure of the foldable three-section clamping device.

As shown in FIGS. 6, 7 and 8, the first clamping arm 31 is further provided with a latch structure 40 for fixing the adjusted positions of the first clamping arm 31 and the extension member 32. The latch structure 40 includes a pressing member 41 and a latching member 42 located at the first clamping arm 31, and at least a rack 43 located at the extension member 32. The pressing member 41 and the latching member 42 are pivotally connected to the housing 310 of the first clamping arm 31. The latching member 42 is hidden inside the housing 310, and the pressing member 41 is partially exposed in the through hole 312 of the housing cover 311. The pressing member 41 further has a flip member 411 in contact with the latching member 42. The latching member 42 has at least one convex tooth 421 that contacts the rack 43. The pressing member 41 has a top portion flush with the housing cover 311 in the absence of an external force but can be pressed down via the through hole 312. When the clamping device is folded, the latch structure 40 is completely hidden between the first support unit 1 and the second support unit 2.

Figure 9A:
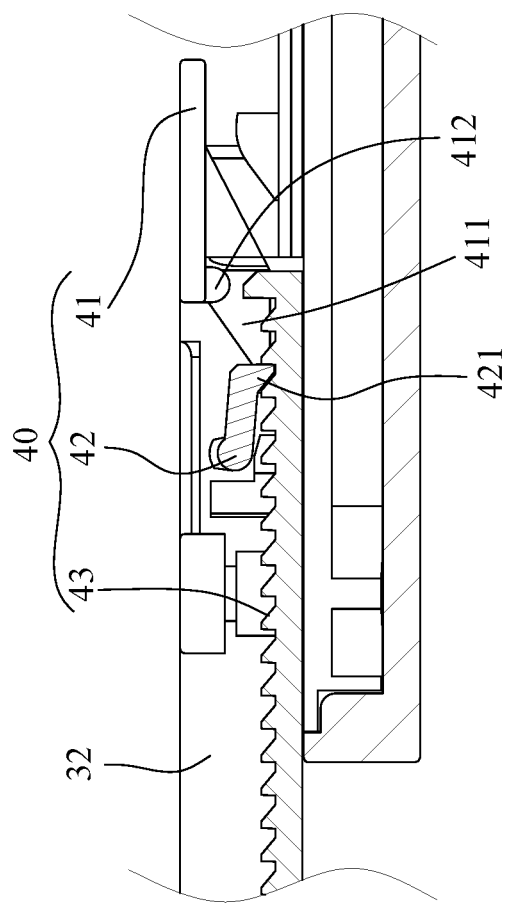
FIG. 9A is a schematic cross-sectional view of a latched state of the latch structure of the foldable three-section clamping device.
Figure 9B:
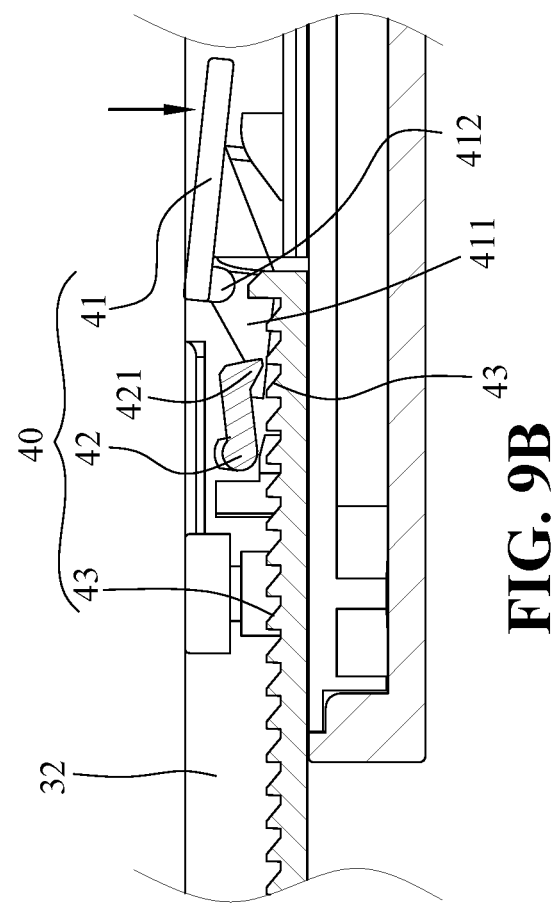
FIG. 9B is a schematic cross-sectional view of a released state of the latch structure of the foldable three-section clamping device.

In the absence of external force, as shown in FIG. 9A, the pressing member 41 is mounted on the housing 310 by a pivot shaft 412 (the housing 310 is not shown in the figure), and the latching member 42 uses the protruding teeth 421 to latch at the rack 43, which is a part of the structure of the extension member 32, so that the extension member 32 cannot be pulled apart (unable to move toward the left direction of the figure). As shown in FIG. 9B, when the pressing member 41 is pressed down, the flip member 411 is raised, and then the convex tooth 421 is lifted off the rack 43, so that the position of the extension member 32 can be changed, thereby changing the relative position of the extension member 32 and the first clamping arm 31.

As shown in FIG. 5, in the present embodiment, the relative position of the extension member 32 with respect to the first clamping arm 31 can be changed by pulling the extension member 32. Then, the first spring 331 in the second clamping arm 33 is used to maintain the clamping force during subsequent clamping, so that the portable electronic product is clamped between the first clamping arm 31 and the second clamping arm 33.

Figure 10:
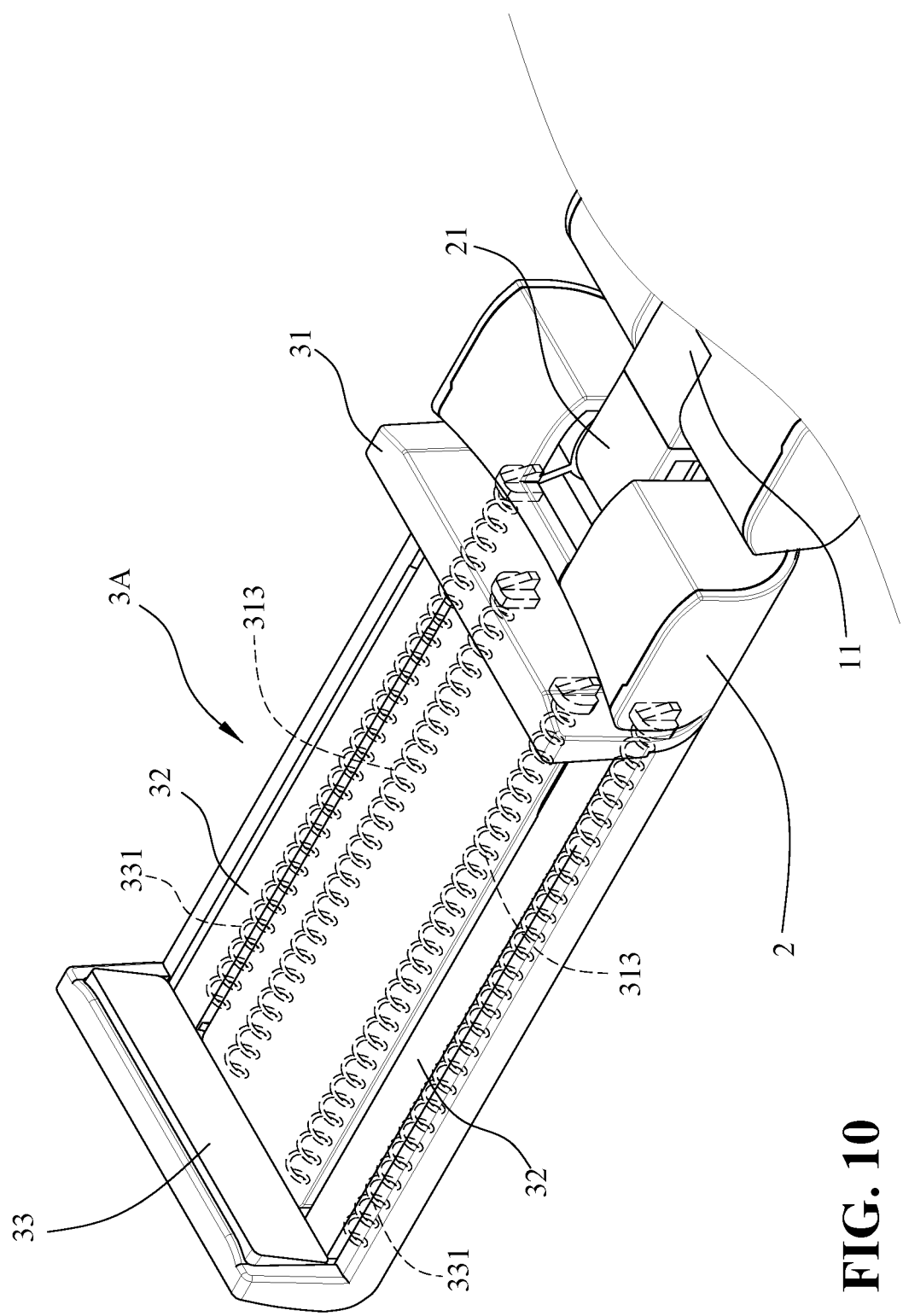
FIG. 10 is a schematic view of a clamping unit in another embodiment of the foldable three-section clamping device.
Figure 11:
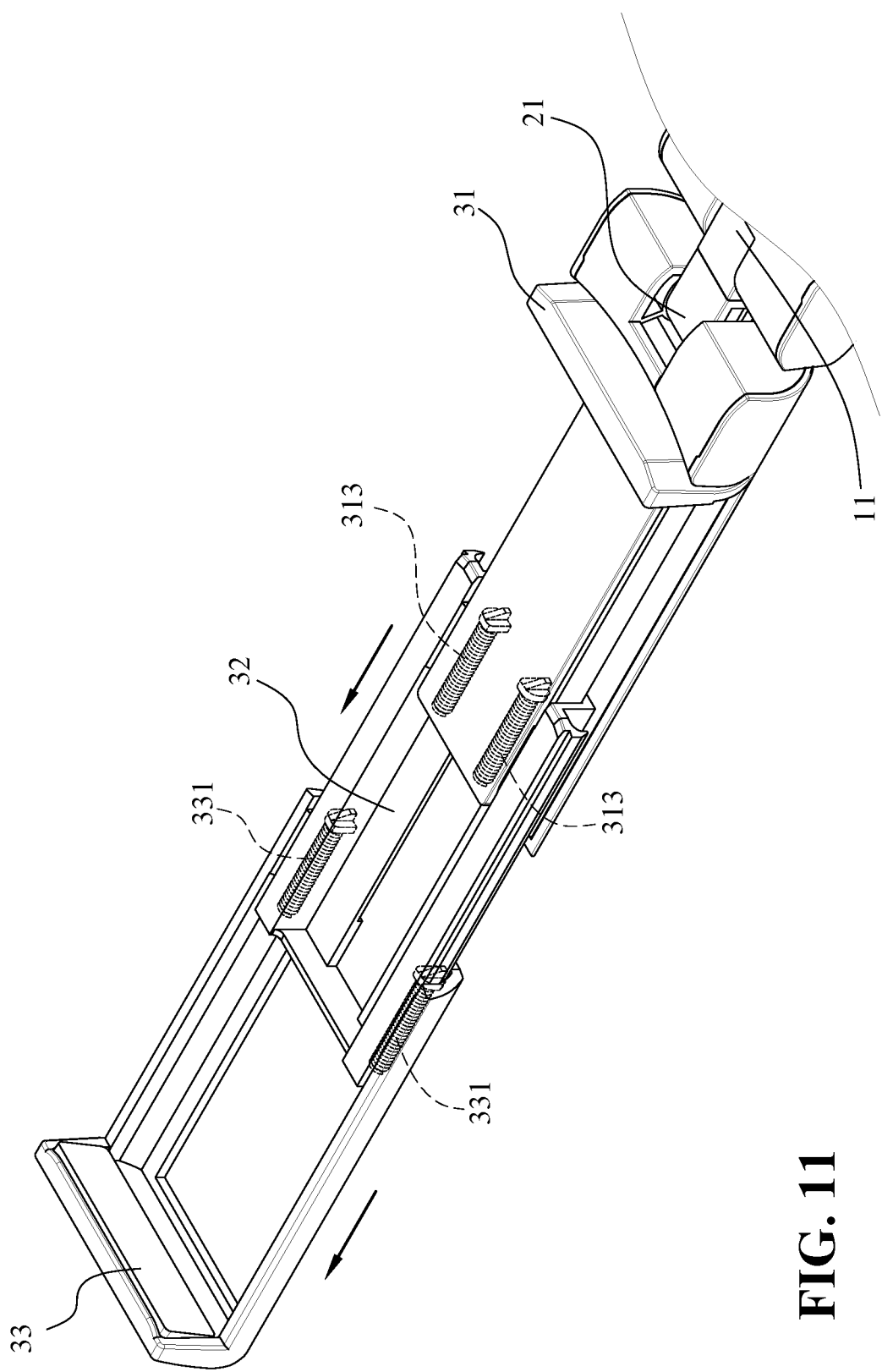
FIG. 11 is a schematic view of the foldable three-section clamping device after the clamping unit is pulled apart in another embodiment.

FIGS. 10 and 11 are schematic views of a second embodiment of the clamping unit 3A of the present invention. In the present embodiment, at least one first spring 331 is disposed in the second clamping arm 33 to contact the extension member 32, and at least one second spring 313 is also disposed in the first clamping arm 31 to contact the extending member 32. The first spring 331 enables the second clamping arm 33 to return to the original position when there is no external force, and the second spring 313 enables the extension member 32 to return to the original position when there is no external force. As such, without external force, the first spring 331 and the second spring 313 keep the second clamping arm 33, the extension member 32 and the first clamping arm 31 close to each other, and the distance between the first clamping arm 31 and the second clamping arms 33 is the shortest (as shown in FIGS. 2 and 10). As shown in FIGS. 5 and 11, after stretching, the distance between the second clamping arm 33 and the first clamping arm 31 is the largest, and has a tightness for clamping the tablet computer.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A foldable three-section clamping device, comprising:
    a first support unit being provided with a rotatable first pivot member, a first extension member extending from a middle part of the first pivot member, and the first support unit having a clamp;
    a second support unit being provided with a rotatable second pivot member, and a second extension member extending from a middle part of the second pivot member, the first extension member and the second extension member being mutually docked and both being rotatable along a same axis;
    a clamping unit being disposed on the second support unit, and the clamping unit further comprising a first clamping arm, a clamping extension member and a second clamping arm, the clamping extension member being disposed on the first clamping arm with a position adjustable by sliding, the second clamping arm being disposed on the clamping extension member with a position adjustable by sliding and provided with at least one spring in contact with the clamping extension member, the first clamping arm and the clamping extension member forming a lateral housing with a housing cover, and the housing cover having a through hole; and
    a latch structure being provided at the first clamping arm to fix the position of the clamping extension member, the latch structure including a pressing member, a latching member located at the first clamping arm, and at least a rack located at the clamping extension member, the pressing member and the latching member being pivotally connected to the lateral housing, the pressing member having a top portion exposed in the through hole and a flip member for contacting the latching member, and the latching member having at least one convex tooth contacting the rack;
    wherein the top portion of the pressing member is flush with the housing cover when no external force is applied and can be pressed down via the through hole to raise the flip member and lift the at least one convex tooth away from the rack to disengage from the rack, thereby adjusting relative positions of the first and second clamping arms, and the latch structure is completely hidden between the first and second support units when the foldable three-section clamping device is folded.

2. The foldable three-section clamping device according to claim 1, wherein the clamp comprises a clip and a movable piece, the clip is located on a side of the first support unit away from the first pivot member, the movable piece is movable linearly in a direction away from the clip, and a tension spring is provided in the first support unit to contact the movable piece to maintain a clamping force between the clip and the movable piece.

3. The foldable three-section clamping device according to claim 2, wherein the clamping unit is located between the clip and the first pivot member when the foldable three-section clamping device is folded.

* * * * *